(12) United States Patent
Varner

(10) Patent No.: US 12,378,982 B1
(45) Date of Patent: Aug. 5, 2025

(54) CLAMPING MECHANISM

(71) Applicant: Andrew Varner, Antioch, TN (US)

(72) Inventor: Andrew Varner, Antioch, TN (US)

( * ) Notice: Subject to any disclaimer, the term of this patent is extended or adjusted under 35 U.S.C. 154(b) by 0 days.

(21) Appl. No.: 19/069,527

(22) Filed: Mar. 4, 2025

Related U.S. Application Data

(60) Provisional application No. 63/740,027, filed on Dec. 30, 2024.

(51) Int. Cl.
| *F16L 3/10* | (2006.01) |
| *F16B 2/10* | (2006.01) |
| *F16B 2/18* | (2006.01) |

(52) U.S. Cl.
CPC ............. *F16B 2/10* (2013.01); *F16B 2/185* (2013.01)

(58) Field of Classification Search
CPC ........... B25B 1/20; B25B 1/125; B25B 5/147; B25B 5/06; H02G 3/32; Y10T 24/44538; Y10T 24/4453; F16B 2/065; F16B 2/185; F16B 2/10
See application file for complete search history.

(56) References Cited

U.S. PATENT DOCUMENTS

| 3,619,891 A | * | 11/1971 | Harrison | ............ B23K 37/0533 |
| | | | | 29/272 |
| 2007/0044281 A1 | * | 3/2007 | Witzel | ................ A47J 37/0786 |
| | | | | 24/455 |
| 2010/0261390 A1 | * | 10/2010 | Gardner | .................... H01R 4/40 |
| | | | | 439/775 |
| 2012/0227221 A1 | * | 9/2012 | Whitaker | .............. F16L 19/025 |
| | | | | 29/525.08 |

* cited by examiner

*Primary Examiner* — Jason W San
*Assistant Examiner* — Michael S Lee
(74) *Attorney, Agent, or Firm* — Bruce A. Lev

(57) ABSTRACT

An improved clamping mechanism that enables rapid and secure attachment to a wide variety of objects and includes an adjustable cuff that incorporates a ratchet mechanism to adjustably and quickly surround and securely contact elongated cylindrical members of various diameters. An additional set screw is incorporated to further tighten a portion of the cuff against a surface of the clamped cylindrical members. The improved clamping mechanism can be used to attach microphones, lights, instruments, smartphones, and other items to existing poles or stands or other equipment, and can be used to manage cables, ropes, wires, and other types of elongated items.

5 Claims, 6 Drawing Sheets

CLAMPING MECHANISM

CROSS-REFERENCE TO RELATED APPLICATION

The present application is related to and claims priority from prior provisional application Ser. No. 63/740,027, filed Dec. 30, 2024 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71 (d).

BACKGROUND OF THE INVENTION

1. Field of the Invention

This invention relates generally to clamping mechanisms, and more specifically to clamping mechanisms for attaching other items existing poles or stands.

2. Description of the Related Art

Prior art clamping mechanisms are not easily attachable or adjustable to properly connect with various sized elongated cylindrical members. Many require tools, such as screwdrivers, to adjust their widths, or are not adjustable at all. Most require many steps to attach or release. As such, prior art clamping mechanisms are not very useful, take too long to attach or detach, and in many instances are not attached securely enough and result in loose and faulty connections. Thus, a need exists for an improved clamping mechanism to avoid the above-mentioned problems.

BRIEF SUMMARY OF THE INVENTION

In view of the foregoing disadvantages inherent in the known types of clamping mechanisms or the like in the prior art, the present invention provides a novel clamping mechanism. As such, the general purpose of the present invention, which will be described subsequently in greater detail, is to provide an improved clamping mechanism that includes a ratchet mechanism to adjustably and quickly surround and securely contact elongated cylindrical members of various diameters. Furthermore, an additional set screw is incorporated to further tighten a portion of the cuff against a surface of the clamped cylindrical members with all the advantages of the prior art and none of the disadvantages.

There has thus been outlined, rather broadly, the more important features of the invention in order that the detailed description thereof that follows may be better understood and in order that the present contribution to the art may be better appreciated. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an improved clamping mechanism, constructed and operative according to the teachings of the present invention.

The various embodiments of the present invention will hereinafter be described in conjunction with the appended drawings.

DETAILED DESCRIPTION

Figure 1:
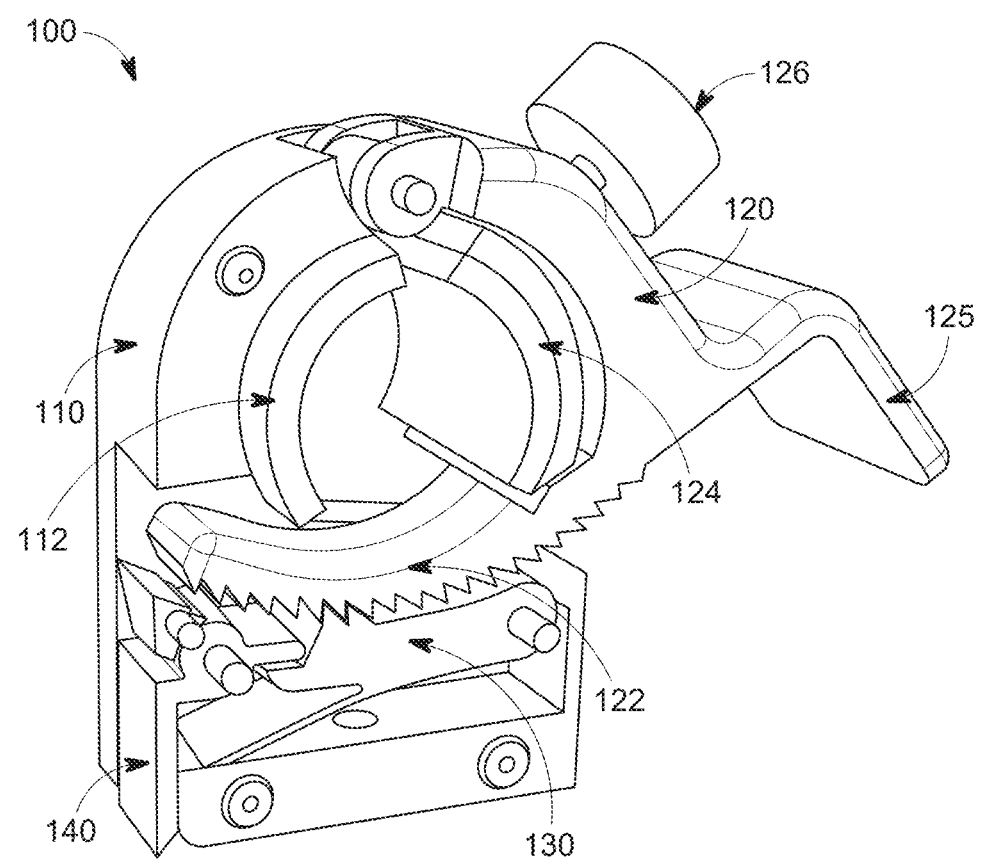
FIG. 1 shows a perspective cut-away view illustrating the improved clamping mechanism according to the preferred embodiment of the present invention.
Figure 2:
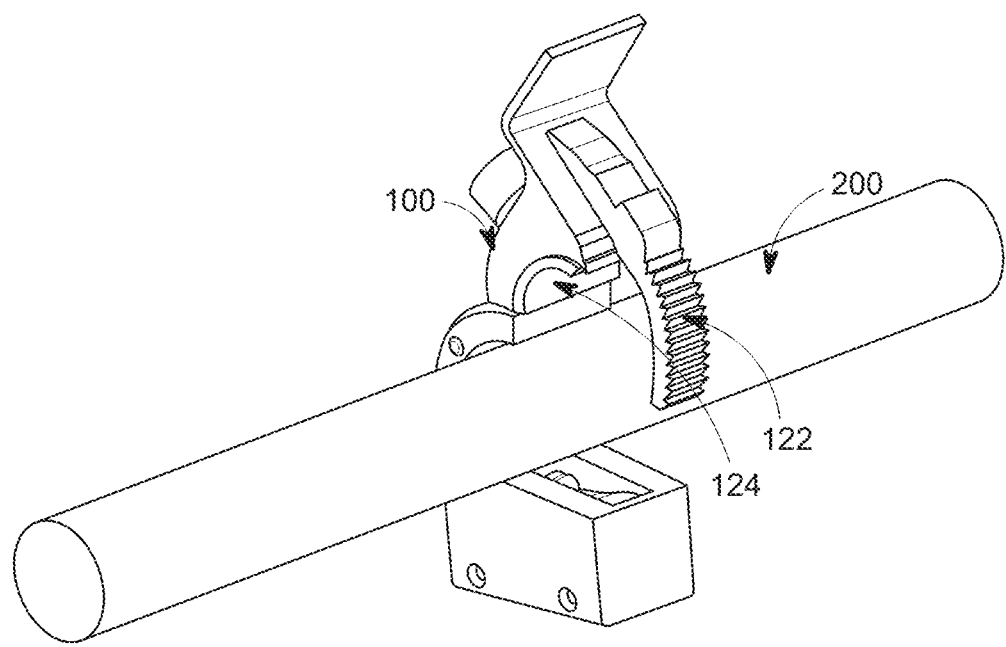
FIG. 2 shows a perspective view illustrating the improved clamping mechanism and elongated cylindrical member to be clamped according to the preferred embodiment of the present invention of FIG. 1.
Figure 3:
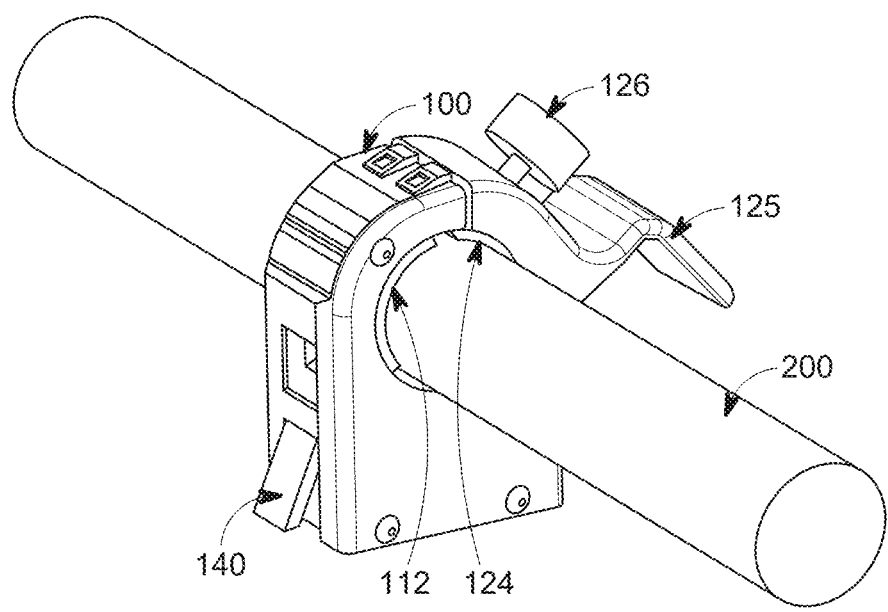
FIG. 3 shows a perspective view illustrating the improved clamping mechanism clamped upon an elongated cylindrical member according to the preferred embodiment of the present invention of FIG. 1.

As discussed above, embodiments of the present invention relate to an improved clamping mechanism and is Referring now to the drawings FIGS. 1-3, the improved clamping mechanism 100 includes a main body 110 including a resilient first cuff member 112 attached thereto; a quick release handle 120 pivotally attached to the main body 110, wherein the quick release handle 120 includes a curved ratchet portion 122, wherein the curved ratchet portion includes a plurality of spaced teeth thereon, an extension member 125, wherein the extension member is used to push, pull, and pivot the quick release handle, and an adjustment set screw 126 adapted to adjustably press against a resilient second cuff member 124 to thereby adjust the pressure the resilient second cuff member 124 exerts upon a member 200 being clamped; wherein the resilient second cuff member 124 is pivotally attached to the quick release handle 120; a pawl member 130 pivotally attached to the main body 110, and biased with respect to the main body via its shape, for example a spring board, and adapted to releasably engage with the teeth of ratchet portion 122 and to thereby releasably hold the ratchet portion 122 in chosen positions, and release the ratchet portion 122 when removing the improved clamping mechanism 100 from the members 200 being clamped; and a pawl locking member 140 pivotally attached to the main body 110 and adapted to releasably engage with the pawl member 130 to thereby hold the pawl member 130 in engagement with the ratchet portion 122, and when depressed releases the pawl member 130 from the ratchet portion 122, such that the quick release handle 120 is allowed to pivot away from the members 200 being clamped and thereby unclamp the members 200.

Figure 4:
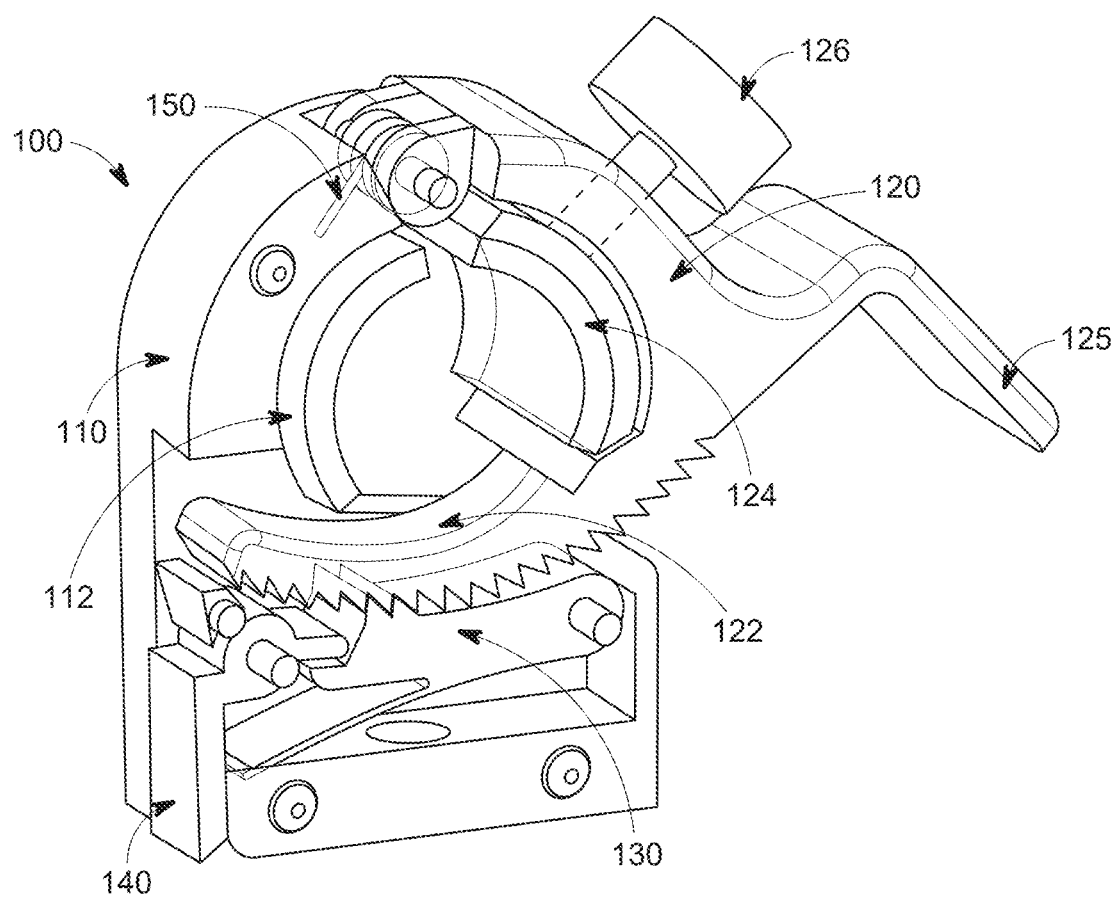
FIG. 4 shows a perspective cut-away view illustrating the improved clamping mechanism including a torsion spring according to the preferred embodiment of the present invention.

As shown in FIG. 4, the improved clamping mechanism 100 may further include a torsion spring 150 that is embedded at a proximal end within main body 110 and at a distal end is connected to second cuff member 124. The first function of torsion spring 150 is to pivotally bias quick release handle 120 away from the main body 110 and the pawl member 130 and into an "open" position when pawl locking member 140 is pressed and the pawl member 130 disengages from ratchet portion 122. The second function of torsion spring 150 is to pull second cuff member 124 back toward its resting position with respect to and adjacent to quick release handle 120 when the adjustment set screw 126 is rotated to reduce pressure applied to the second cuff member 124.

Figure 5:
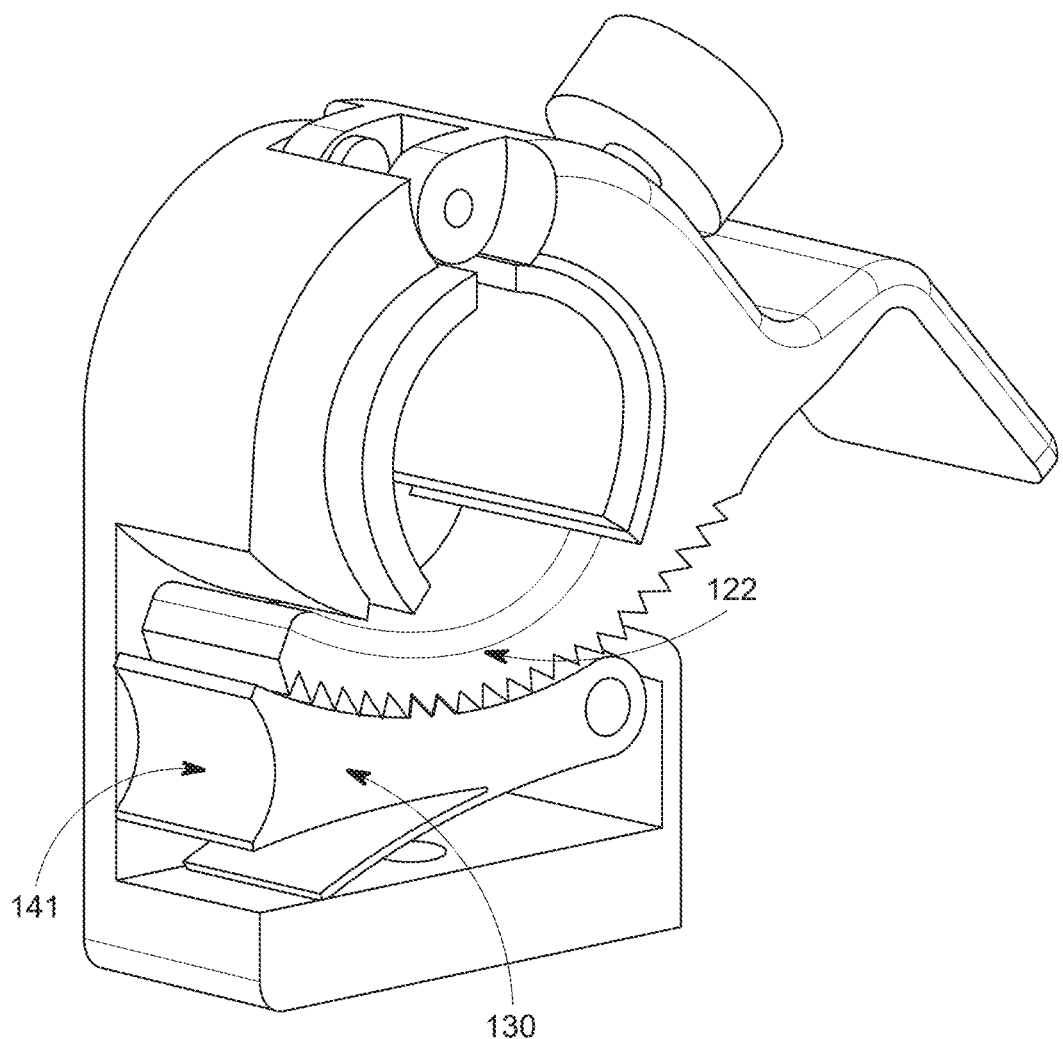
FIG. 5 shows a perspective cut-away view illustrating the improved clamping mechanism including a second embodiment of the pawl locking member.
Figure 6:
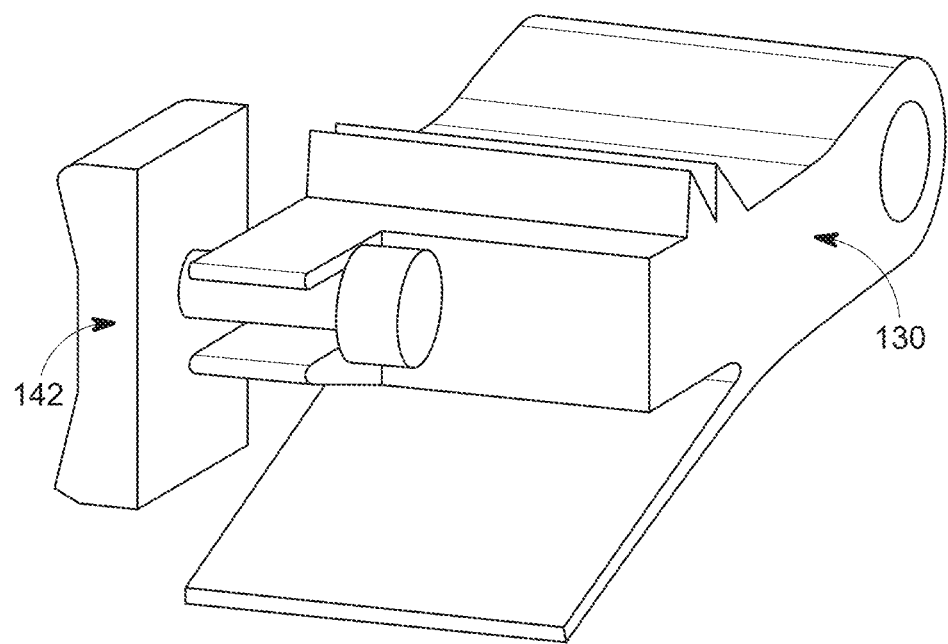
FIG. 6 shows a perspective view illustrating the improved clamping mechanism including a third embodiment of the pawl locking member.

FIGS. 5 and 6 show alternate embodiments of pawl locking member 140. In FIG. 5, the pawl locking member 141 is formed integrally with pawl member 130, and is simply depressed to thereby release pawl member 130 from engagement with the teeth of ratchet portion 122. FIG. 6 shows a slide pawl release member 142 that engages and disengages with pawl member 130 to thereby hold and release pawl member 130 from engagement with the teeth of ratchet portion 122.

When in use, the main body 110 and resilient first cuff member 112 are placed around a portion of the elongated cylindrical member 200, or members, to be clamped. Then the quick release handle 120 is placed around a second portion of the elongated cylindrical member, or members 200, to be clamped. Then the extension member 125 is used to push the ratchet portion 122 into engagement with the pawl member 130, thereby pressing and holding the second cuff member 124, and the first cuff member 112, against the elongated cylindrical member 200, or members, and thereby clamping thereto at a desired clamping force. Then the adjustment set screw 126 can be used to fine tune the amount of clamping force being exerted on the cylindrical member(s) 200. When releasing the improved clamping mechanism 100 from the cylindrical member(s) 200, the pawl locking member 140 is pressed thereby releasing the pawl member 130 from the ratchet portion 122, such that the quick release handle 120 is allowed to pivot away from the members 200 being clamped and thereby unclamping the member(s) 200.

Uses for the improved clamping mechanism 100 include attaching microphones, lights, instruments, smartphones, drinks, medical devices, and other items to existing poles or stands 200 or other equipment, including bicycle handle bars, and handle bars on strollers, and also can be used to manage cables, ropes, wires, and other types of elongated items. Other elongated items with shapes other than cylindrical or round can be clamped as well. Furthermore, the pawl member 130 and the pawl locking member 140 can also be spring biased.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. An improved clamping mechanism comprising:
   a main body:
   a resilient first cuff member;
      wherein said resilient first cuff member is attached to said main body;
   a quick release handle including:
      a curved ratchet portion;
         wherein said curved ratchet portion includes a plurality of spaced teeth thereon;
      an extension member;
         wherein said extension member is used to push, pull, and pivot said quick release handle; and
      an adjustment set screw;
         wherein said adjustment set screw is adapted to adjustably press against a resilient second cuff member to thereby adjust the pressure said resilient second cuff member exerts upon a member being clamped;
      wherein said quick release handle is pivotally attached to said main body;
   said resilient second cuff member is pivotally attached to said quick release handle
   a pawl member;
      wherein said pawl member is pivotally attached to said main body and is adapted to releasably engage with said teeth of said curved ratchet portion and thereby releasably hold said curved ratchet portion in chosen positions, and release said curved ratchet portion when removing said improved clamping mechanism from a member being clamped; and
   a pawl locking member;
      wherein when said pawl locking member is depressed said pawl locking member releases said pawl member from said ratchet portion, such that said quick release handle is allowed to pivot away from a member being clamped and thereby unclamp said member;
   wherein when in use, said extension member is used to push said ratchet portion into engagement with said pawl member, thereby pressing and holding said second cuff member, and said first cuff member against said member being clamped and thereby clamping thereto at a desired clamping force; then said adjustment set screw is used to further adjust the amount of clamping force being exerted on the member being clamped; and when releasing said improved clamping mechanism from said member being clamped, said pawl locking member is pressed thereby releasing said pawl member from said ratchet portion, such that said improved quick release handle is allowed to move away from said member being clamped and thereby unclamping said member.

2. The improved clamping mechanism of claim 1, further including:
   a torsion spring;
      wherein said torsion spring is embedded at a proximal end within said main body, and connected at a distal end to said second cuff member;
      wherein a first function of said torsion spring is to pivotally bias the quick release handle away from said main body and said pawl member and into an open position when said pawl locking member is pressed and said pawl member disengages from ratchet portion; and
      wherein a second function of said torsion spring is to pull said second cuff member back toward a resting position with respect to and adjacent to said quick release handle when said adjustment set screw is rotated to reduce pressure applied to said second cuff member.

3. A combination of a stand and an improved clamping mechanism comprising:
   a stand including:
      a cylindrical pole;
         wherein said stand is adapted to hold equipment thereon; and an improved clamping mechanism comprising:
  a main body:
  a resilient first cuff member;
    wherein said resilient first cuff member is attached to said main body;
  a quick release handle including:
  a curved ratchet portion;
    wherein said curved ratchet portion includes a plurality of spaced teeth thereon;
  an extension member;
    wherein said extension member is used to push, pull, and pivot said quick release handle; and
  an adjustment set screw;
    wherein said adjustment set screw is adapted to adjustably press against a resilient second cuff member to thereby adjust the pressure said resilient second cuff member exerts upon said cylindrical pole of said stand being clamped;
  wherein said quick release handle is pivotally attached to said main body;
said resilient second cuff member is pivotally attached to said quick release handle
a pawl member;
  wherein said pawl member is pivotally attached to said main body and is adapted to releasably engage with said teeth of said curved ratchet portion and thereby releasably hold said curved ratchet portion in chosen positions, and release said curved ratchet portion when removing said improved clamping mechanism from said cylindrical pole of said stand being clamped; and
a pawl locking member;
  wherein when said pawl locking member is depressed said pawl locking member releases said pawl member from said ratchet portion, such that said quick release handle is allowed to pivot away from said cylindrical pole of said stand being clamped and thereby unclamp said member;
  wherein when in use, said extension member is used to push said ratchet portion into engagement with said pawl member, thereby pressing and holding said second cuff member, and said first cuff member against said cylindrical pole of said stand being clamped and thereby clamping thereto at a desired clamping force; then said adjustment set screw is used to further adjust the amount of clamping force being exerted on said cylindrical pole of said stand being clamped;
  and when releasing said improved clamping mechanism from said cylindrical pole of said stand being clamped, said pawl locking member is pressed thereby releasing said pawl member from said ratchet portion, such that said improved quick release handle is allowed to move away from said cylindrical pole of said stand being clamped and thereby unclamping said cylindrical pole of said stand.

4. The combination of claim 3, further including:
a torsion spring;
  wherein said torsion spring is embedded at a proximal end within said main body, and connected at a distal end to said second cuff member;
  wherein a first function of said torsion spring is to pivotally bias the quick release handle away from said main body and said pawl member and into an open position when said pawl locking member is pressed and said pawl member disengages from ratchet portion; and
  wherein a second function of said torsion spring is to pull said second cuff member back toward a resting position with respect to and adjacent to said quick release handle when said adjustment set screw is rotated to reduce pressure applied to said second cuff member.

5. The combination of claim 3, wherein said stand is formed as a stand chosen from a group of stands consisting of a microphone stand, a light stand, an instrument stand, a smartphone stand, a drink stand, and a medical device stand.

* * * * *